United States Patent [19]

Stefens

[11] 4,326,821
[45] Apr. 27, 1982

[54] INSTALLING SUBMERGED PIPELINE

[75] Inventor: Walter L. Stefens, Santa Barbara, Calif.

[73] Assignee: Solus Ocean Systems, Inc., Houston, Tex.

[21] Appl. No.: 173,828

[22] Filed: Jul. 31, 1980

[51] Int. Cl.³ ............................................... F16L 1/04
[52] U.S. Cl. .................................. 405/171; 405/154; 405/158
[58] Field of Search ......... 405/158, 162, 164, 168–171

[56] References Cited

U.S. PATENT DOCUMENTS

| Re. 23,963 | 3/1955 | Collins | 405/162 |
|---|---|---|---|
| 2,780,376 | 2/1957 | Sanders | 405/170 X |
| 3,616,651 | 11/1971 | Chang et al. | 405/158 |
| 3,727,417 | 4/1973 | Shaw | 405/171 |
| 4,107,933 | 8/1978 | Lamy | 405/171 |
| 4,127,006 | 11/1978 | Oosterkamp | 405/171 |

FOREIGN PATENT DOCUMENTS 2019976 11/1979 United Kingdom ................ 405/162

*Primary Examiner*—Price C. Faw, Jr.
*Assistant Examiner*—Nancy J. Pistel
*Attorney, Agent, or Firm*—W. R. Hulbert

[57] ABSTRACT

A system for installing one or more side-by-side submerged pipelines from the shore while preventing abrasive contact between the pipe and any of the ground, the seabed or the equipment used. The line is assembled from joints on shore, clamped between timbers at spaced intervals, hauled down a track supported by the timbers to the water's edge where buoyant spherical wheels are detachably secured to the clamping timbers. The pipeline is pulled into the water, rolling on the wheels which maintain it in spaced relation to the seabed and which when the pipeline reaches its final destination, are released to float to the surface for retrieval. Additional lengths of pipe may be added periodically on the shore so that pipelines of any desired length can be installed. The wheel assemblies are released by pulling buoyed trip lines whose buoys floating on the surface mark the path of travel of the pipeline as it is pulled along the seabed.

19 Claims, 4 Drawing Figures

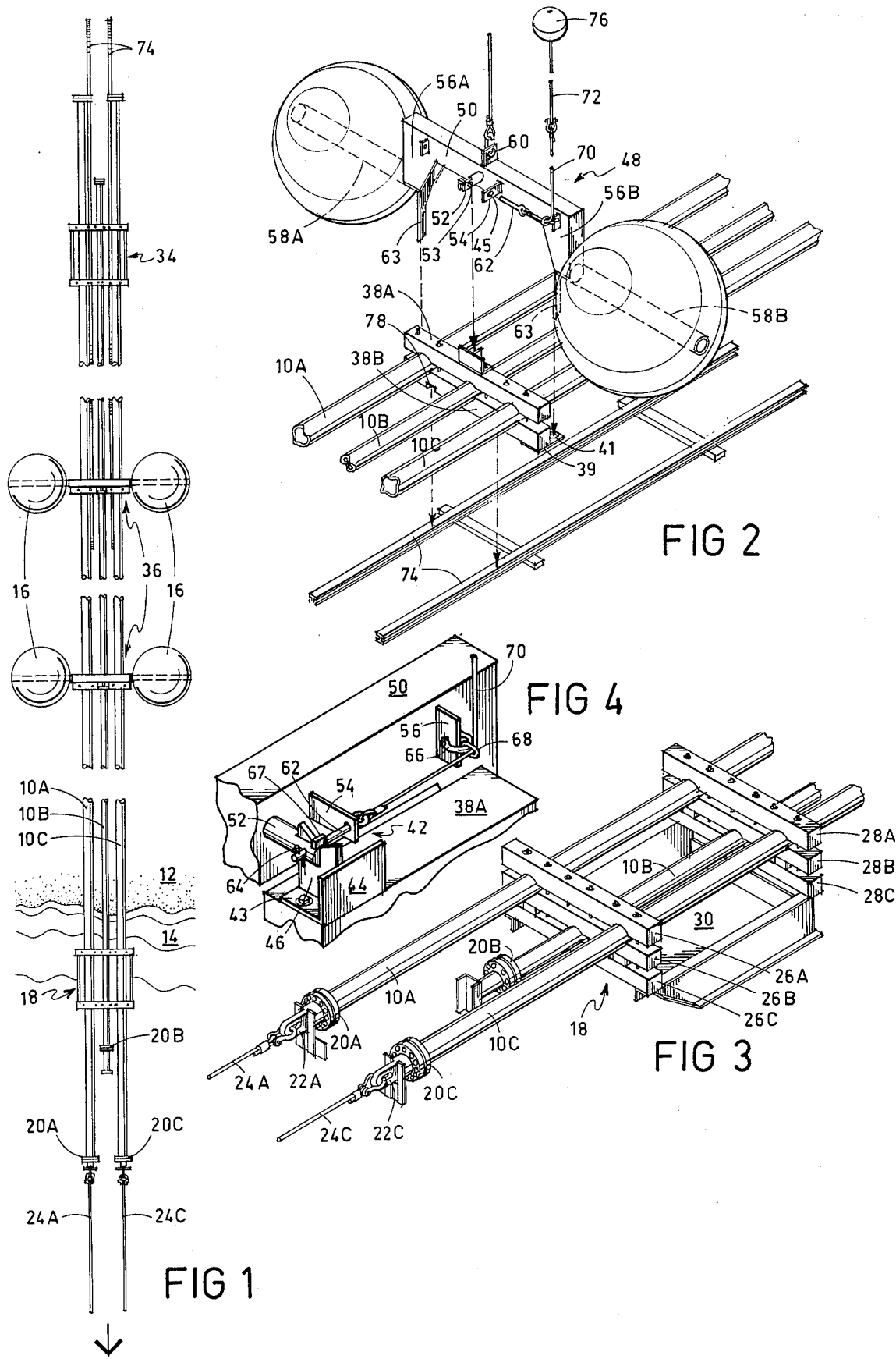

INSTALLING SUBMERGED PIPELINE

BACKGROUND OF THE INVENTION

Submerged pipelines are usually installed either by dragging the pipe along the bottom (see U.S. Pat. No. 4,191,494), pulling the pipeline while maintained in a buoyant condition (U.S. Pat. Nos. 3,849,997 and 4,107,933), or deploying the pipe from a conventional lay barge. Any procedure involving moving contact between the pipe and either the seabed or the handling equipment may be damaging to the pipe, particularly if coated with a material sensitive to abrasion damage; the last named method is expensive and not cost effective when laying relatively short lines.

The object of the invention is to provide a system for installing submerged pipelines by pulling them into the water from the shore while providing means for supporting them both during the pull and after installation so they do not touch the seabed while avoiding abrasive contact with any of the installing apparatus. In addition, where several lines are to be simultaneously installed, it is an object of the invention to permit them to be firmly gripped in predetermined mutually spaced side-by-side orientation for being simultaneously pulled to their final location.

SHORT STATEMENT OF THE INVENTION

In accordance with the invention there is provided a system for installing submerged pipelines comprising means for gripping at least one pipeline at longitudinally spaced intervals and supporting the same vertically spaced above the seabed, detachable buoyant wheel means for permitting the pipeline to be pulled along the sea bottom, and means for detaching and retrieving the wheel means after the pipeline has been pulled to a predetermined location.

In preferred embodiments, the wheel means comprise pairs of hollow spherical wheels journaled to cross members adapted to be detachably secured to the gripping means at spaced intervals along the length of the pipeline; the gripping means comprises upper and lower cross member assemblies clamped to the pipeline; the bottoms of the cross member assemblies are notched permitting the pipeline to be pulled on a track on the shore to a location from which it can leave the track and enter the water; the detaching and retrieving means comprises a remotely releasable latch which locks the wheel means to the gripping means and a buoyed retrieving line leading to the surface of the water for actuating the latch, so that the buoyant wheel means will float to the surface still attached to said line after being released; more than one pipeline may be gripped by the gripping means for simultaneous installation; successive additional lengths of pipe may be added to the pipeline on shore after a length has been pulled into the water, whereby any desired total length of pipeline may be installed; a lead sled may be provided gripping the leading end of the pipeline.

The invention includes the method of assembling a pipeline of predetermined length on the shore, pulling the line into the water while supporting it against touching the ground on shore, providing detachable wheel means for movably supporting the line spaced above the seabed, pulling the line to a predetermined submerged location and releasing and retrieving the wheel means.

Preferred methods include the following: gripping of at least one string of pipeline at longitudinally spaced intervals by means for supporting the same vertically spaced above the seabed, providing detachable buoyant wheel means secured to the supporting means thereby permitting the string to be pulled along the sea bottom, towing the pipeline to a desired location, and releasing and retrieving the wheel means after the pipeline has been pulled to such location; assembling joints of pipe on shore into a pipeline of predetermined length, supporting the line at intervals by means preventing it from touching the ground or the seabed after installation, detachably securing buoyant wheel means at spaced intervals along the line for rollably supporting the line above the seabed as it is pulled along and pulling the line into the water supported above the seabed on the wheel means; the advance of the pipeline into the water may be periodically halted when the trailing end nears the water and preassembled and supported additional lines secured thereto in succession so that the thus interconnected successive lines can be pulled into the water and along the seabed as before; the pipeline may be dragged along a track on the shore to the water's edge preliminary to the securing of the wheel means thereto; more than one pipeline may be clamped together side by side for pulling simultaneously into the water; after the pipeline is pulled to a predetermined location on the seabed and the buoyant wheel means released from the pipeline for retrieval, the pipeline will remain supported in spaced relation to the seabed by the supporting means; each of the buoyant wheel means may be provided with a buoyed release line leading to the surface of the water whereby the path of the pipeline as it is being pulled along the seabed can be tracked from the surface and the wheel means released from the pipeline when it has arrived at the desired location by pulling on the release lines.

Further objects, features and advantages of the invention will appear from the following detailed description of a preferred embodiment thereof taken in conjunction with the accompanying drawings.

BRIEF DESCRIPTION OF THE DRAWINGS

In the drawings,

FIG. 1 is a plan view of a system employing the invention whereby three side-by-side pipelines may be pulled into the water from a shore;

FIG. 2 is an exploded perspective on a larger scale of one of the gripping and wheel means for supporting the pipe strings shown in FIG. 1 and permitting them to be pulled into the water and along the seabed;

FIG. 3 is a view in perspective of the leading sled which holds the three pipe strings and the means permitting attachment of towing cables thereto; and FIG. 4 is a fragmentary detail of the detachable means for latching the wheel assembly to the pipe gripping assembly whereby the former, after the pipeline has been pulled to final location, may be detached by remote control from the surface and retrieved.

DETAILED DESCRIPTION OF PREFERRED EMBODIMENT

In FIG. 1 three side-by-side strings 10A, 10B and 10C of pipe are shown being pulled from the shore 12 into the water 14 by suitable towing means, while rolling on spaced pairs of spherical rollers 16 on the seabed. The pipes are kept out of contact with the seabed and may be moved eventually to a final location where the wheel assemblies may be detached and retrieved. At the leading end of the pipe strings the pipes are clamped firmly together in a lead sled 18. The ends of the pipes are sealed by suitable covers 20A, 20B and 20C. The two outboard covers 20A and 20C are provided with eyes 22A and 22C permitting attachment of towing cables 24A and 24C.

The construction of the lead sled is made clear from FIG. 3. It consists of a forward series of three cross timbers 26A, 26B and 26C and an aft series of three cross timbers 28A, 28B and 28C suitably grooved to fit the diameters of the pipes so as to clamp them firmly in place between the timbers and mounted on a skid 30.

At the trailing end of the pipe strings is a trailing sled 34 whose construction is similar to that of the lead sled and, hence, will not be described.

At intervals of about 112' centers along the pipe strings, combination wheel and pipe clamping assemblies 36 are provided for gripping the pipe and supporting the strings both above the land while being pulled into the sea from the end of a track and above the sea bottom when under water so that the pipes will not touch the ground on the shore or the seabed during placement. Details of one combination clamping and wheel assembly appear in FIGS. 2 and 4. Each timber of a pair of cross timbers 38A, 38B is suitably grooved to receive and clamp between the timbers the three pipe strings 10A, 10B and 10C at a predetermined distance from and parallel to each other. The bottom timber 38B is notched at 78 for a purpose hereinafter explained. The upper timber 38A has bolted to its upper surface at its center a locking assembly 42 comprising a flat horizontal plate 43 bolted to the timber 38A and having two vertical upstanding flanges 44 and 46. The flange 46 lies in a vertical longitudinal plane and has a V notch in its upper edge and a latching hole (not visible in the drawings) whose axis is transverse to that of the pipe string. Attachable to the member 38A is the axle and wheel assembly 48 comprising a rectangular tubular steel axle 50 which has extending horizontally from its front face a bar 52 which is apertured to provide a hole 53 which matches the hole in flange 46 when the assembly is lowered into position on top of the cross timber 38A. Axle 50 also carries on its face a protruding vertically oriented apertured flange 54 which is spaced from and parallel to bar 52. Its hole 45 is in alignment with hole 53. Spaced further from bar 52 is mounted a second vertical flange 56. Axle 50 has depending legs 56A and 56B at each end from which extend journal shafts 58A, 58B which are journaled in hermetically sealed spherical rollers 16 which serve as wheels on which the pipe string assembly can roll. Axle 50 is provided with an eye 60 and locating studs 63 which fit holes 41 in plates 39 bolted to the bottom of timber 38B at each end thereof to facilitate positioning the wheel assembly accurately in place on the pipe-gripping cross timbers. Offset projection 67 near the end of bar 52 centers the axle longitudinally to assure hole alignment.

When the axle is in lowered position the holes in bar 52 and flanges 46 and 54 are thus in alignment and can receive releasable locking pin 62 at the end of which is a hole to receive a shear pin 64 which acts as a safety pin to prevent accidental withdrawal of the release pin until such time as it is desired to retrieve the wheel assembly. A shackle 66 is fitted to flange 56 on axle 50 and it in turn holds a ring 68 which can be a chain link. Threaded through the chain link is a short cable 70 provided with eyes at both ends, one end being secured to the nearer end of release pin 62 and the other being connected to a trip line 72 which will run to the surface when the pipe string is submerged and terminate in a buoy 76. Pulling on line 72 will shear pin 64, withdraw pin 62 from its locked engagement in bar 52 so that the assembly 48 can float to the surface buoyed by hollow spherical wheels 16. The line 72 cannot escape from the assembly 48 because the eye of cable 70 is too big to pass through line 68.

The entire assembly is constructed and arranged to slide on a track 74 on the land, the track leading down across the beach to the edge of the water 14. The track is long enough so that a pipe section 440 feet in length may be assembled to the other components at one time.

A specific example of the use of the invention in installing a triple 2.2 mile pipeline between offshore drilling platforms is as follows.

The scheduled 80 lines, one 6" and two 8", were to be externally coated with fused epoxy which was sensitive to abrasion damage and precluded installation by normal bottom tow. In final position the lines were to be no further than 2' apart, and they were not to touch the sand seabed. An off-bottom or surface tow was impractical because of current and wave factors. Use of a conventional lay barge implied high mobilization/demobilization costs.

Fifty-eight inch diameter spherical steel floats modified with pipe axle journals through the centers were chosen to prevent coating damage. Used in pairs located at 112 foot centers along the line, the float assemblies 48 were attached to the cross axle/timber assemblies 38A, 38B that secured the three pipelines 10A, 10B and 10C together to permit a simultaneous pull. The spheres served the multiple functions of acting as wheels to provide adequate bottom clearance, rolling bottom contact to reduce pull forces and buoyancy to partially offset the negative weight of the pipelines. Designed for remotely actuated detachment, as above described, the wheel-floats could be retrieved when the line bundle was in final position between the platforms.

A suitable beach assembly site was found from which pipeline could be deployed to the beach by laying temporary rails 74 from the site to the shore. The timber pipeline and axle supports 38B maintained alignment on the I-beam rails by reason of notches 78.

The pipe joints were welded at the site into 440 foot strings, field joints being protected by a 15 mil coating of sprayed epoxy powder fused at 480° F. Anodes were attached every 600' to 1,000' along the strings.

One hundred and thirty sets of wheel-floats and axle assemblies were provided, the wheel-float assemblies 48 being designed to lock into the timber supports 38A and be secured by release pins 62 and shear pins 64 which were later cut by float-equipped tag lines on the surface for retrieval. The pipe strings were pigged during assembly, and the two 8" lines were fitted with pullheads 20A, 20C. The three lines were equipped with flooding-/deballasting valves to control buoyancy during the tow. The lead and trailing ends of the pipe bundle were secured to box form leading and trailing sleds 18 and 34.

The offshore pull was accomplished by using a construction barge equipped with a Skagit RB 90 winch. The initial barge setting was made 4,000' offshore using three 3,000 pound bow anchors. Two stern anchors were used for drift stability. The wheel-float axle assemblies 48 were installed by crane as each timber unit reached the beach. As each 440' bundle of pipe was pulled into the surf, the 1¼" pull wire was slacked and a new 440' bundle welded on, x-rayed and coated. The setting of the barge was repeated until all 2.2 miles of pipe bundle were deployed off the beach. Thereafter the dynamic tow was initiated using the power of the barge and a bow tug. The trailing end of the bundle was guided by another vessel to assure clear transit by the sub-sea wellheads in the area. Barge/pipeline position was continuously maintained by precision navigation and overall pipeline location was determined by visual tracking of the tag line buoys 76. Breakout forces averaged 35,000 pounds and dynamic tow force was 25,000 pounds.

The 2.2 miles of pipe bundle were successfully towed 10½ miles with the line ends in correct orientation to the respective drilling platforms. Preinstalled dewatering pigs were pumped through the lines. The tag lines 72 were pulled to shear the pins 64 and pull the release pins from the holes 53, thereby releasing assemblies 48 from cross-timbers 38A, and the floating wheel-float assemblies 48 were retrieved for future use.

While there has been disclosed and described a presently preferred embodiment of the invention, it will nevertheless be understood that the same is capable of modification and change by those skilled in the art and, therefore, it is intended that the scope of the invention be measured only by the proper interpretation to be afforded the appended claim.

I claim:

1. A system for installing submerged pipe lines comprising
    means for non-abrasively gripping at least one pipeline at longitudinally spaced intervals and supporting the same vertically spaced above the seabed
    detachable buoyant wheel means for permitting said pipeline to be pulled along out of contact with the seabed, and
    means for detaching and retrieving said wheel means after the pipeline has been pulled to a predetermined location.

2. The system of claim 1 wherein said wheel means comprise pairs of hollow spherical wheels journaled to cross members adapted to be detachably secured to said gripping means at spaced intervals along the length of the pipeline.

3. The combination of claim 1 or claim 2 wherein said gripping means comprises upper and lower cross member assemblies clamped to said pipeline.

4. The combination of claim 3 including means on the bottom of said cross member assemblies permitting said pipeline to be pulled on a track on the shore to a location from which it can leave the track and enter the water.

5. The system of claim 1 wherein said detaching and retrieving means comprises a remotely releasable latch locking said wheel means to said gripping means and a buoyed retrieving line leading to the surface of the water for actuating said latch so that said buoyant wheel means will float to the surface attached to said line after being released.

6. The system of claim 1 wherein more than one pipeline is gripped by said gripping means for simultaneous installation.

7. The system of claim 1 wherein successive additional lengths of pipe may be added to the pipeline on shore after a length has been pulled into the water whereby any desired total length of pipeline may be installed.

8. The system of claim 1 including a lead sled gripping the leading end of said pipeline.

9. The combination of claim 4 including said track.

10. A method of installing submerged pipelines comprising
    gripping at least one string of pipe at longitudinally spaced intervals by means for supporting the same vertically spaced above the seabed
    providing detachable buoyant wheel means secured to said supporting means thereby permitting said string to be pulled along out of contact with the seabed,
    towing said pipeline to a desired location, and releasing and retrieving said wheel means after the pipeline has been pulled to said location.

11. A method of installing submerged pipelines comprising
    assembling joints of pipe on shore into a pipeline
    supporting said line at intervals by means preventing it from touching the ground or the seabed after installation
    detachably securing buoyant wheel means at spaced intervals along said line for rollably supporting said line above the seabed as it is pulled along and
    pulling said line into the water supported above the seabed on said wheel means.

12. The method of claim 11 including the steps of periodically halting the advance of said line when the trailing end nears the water and attaching thereto successive pre-assembled and supported lines, securing additional detachable buoyant wheel means to each successive line and pulling the thus interconnected successive lines into the water and along the seabed as before.

13. The method of either claim 11 or claim 12 wherein said line is dragged supported by said supporting means along a track on the shore to the water's edge preliminary to the securing of the wheel means thereto.

14. The method of claim 11 or claim 12 wherein more than one pipeline are clamped together side by side for pulling simultaneously into the water.

15. The method of claim 11 or claim 12 including the step of pulling the pipeline to a predetermined location on the seabed supported by said wheel means and then releasing the buoyant wheel means from the pipeline for retrieval while the pipeline remains supported in spaced relation to the seabed by said supporting means.

16. The method of claim 15 wherein each of said buoyant wheel means is provided with a buoyed release line leading to the surface of the water whereby the path of the pipeline as it is being pulled along the seabed can be tracked from the surface and the wheel means released from the pipeline when it has arrived at the desired location by pulling on the release lines.

17. A method of installing submerged pipelines which comprises
    assembling a pipeline of predetermined length on the shore,
    pulling said line into the water while supporting it against touching the ground on the shore,
    providing detachable wheel means for movably supporting the line spaced above the seabed,
    pulling the line to a predetermined submerged location, and
    releasing and retrieving the wheel means.

18. The method of claim 17 including reducing the negative buoyancy of the pipeline by partially supporting its weight by the use of buoyant detachable wheel means.

19. The combination of claim 2 wherein said hollow spherical wheels are disposed and arranged to exert a lifting force on said pipeline partially offsetting its negative buoyancy to reduce the pull forces to pull it along the seabed.

* * * * *